May 25, 1954 — M. E. HOWARD ET AL — 2,679,403
WHEEL GUARD FOR TRUCKS
Filed April 25, 1952 — 2 Sheets-Sheet 1

INVENTORS
MARION E. HOWARD,
DUEL WINEBAUGH,
BY McMorrow, Berman & Davidson
ATTORNEYS.

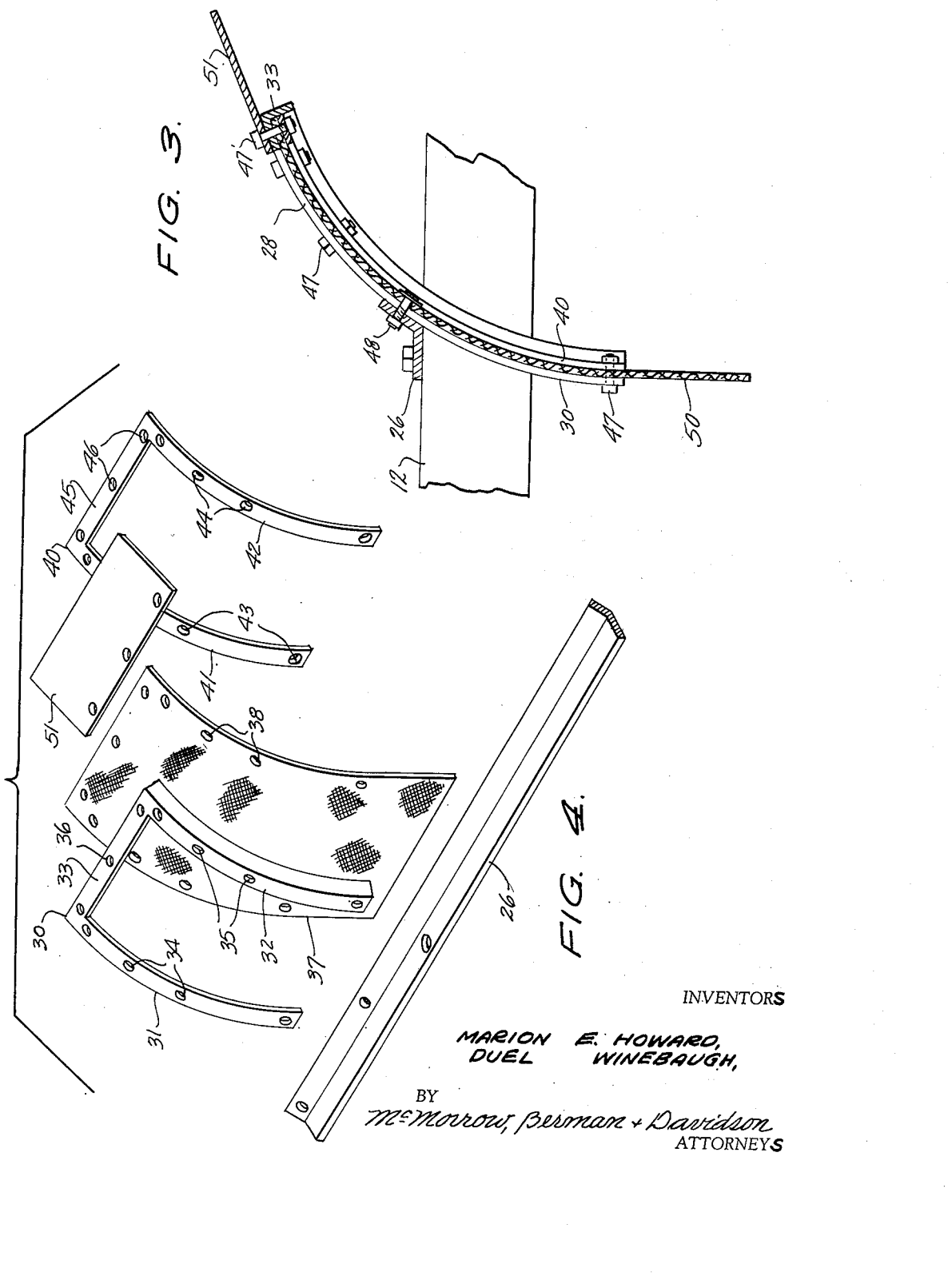

Patented May 25, 1954

2,679,403

UNITED STATES PATENT OFFICE 2,679,403

WHEEL GUARD FOR TRUCKS

Marion E. Howard and Duel Winebaugh, Detroit, Mich.

Application April 25, 1952, Serial No. 284,262

3 Claims. (Cl. 280—154.5)

This invention relates to wheel guards for trucks and more particularly to guards for the dual traction wheels of semi-trailer trucks to protect the cab and gasoline tanks of the tractor component of such a truck from mud, tar, stones and other material thrown from the traction wheels.

It is among the objects of the invention to provide a wheel guard assembly that can be easily mounted on the tractor component of a tractor trailer or semi-trailer truck in front of the rear traction wheels of the tractor component to protect the cab and gasoline tanks of the tractor component from material thrown from the traction wheels; which provides wheel guards extending over the upper front portions of both dual traction wheels and means firmly supporting the wheel guards on the frame of the tractor component; which can be installed on an existing tractor with no material modification of the tractor construction and does not interfere in any way with the operation of the tractor or the trailer; and which is simple and durable in construction, economical to manufacture, and positive and effective in use.

Other objects and advantages will become apparent from a consideration of the following description and the appended claims in conjunction with the accompanying drawings wherein:

Figure 3 is a cross sectional view on an enlarged scale on the line 3—3 of Figure 2; and Figure 4 is an exploded perspective view of substantially one-half of the wheel guard assembly.

Figure 2:
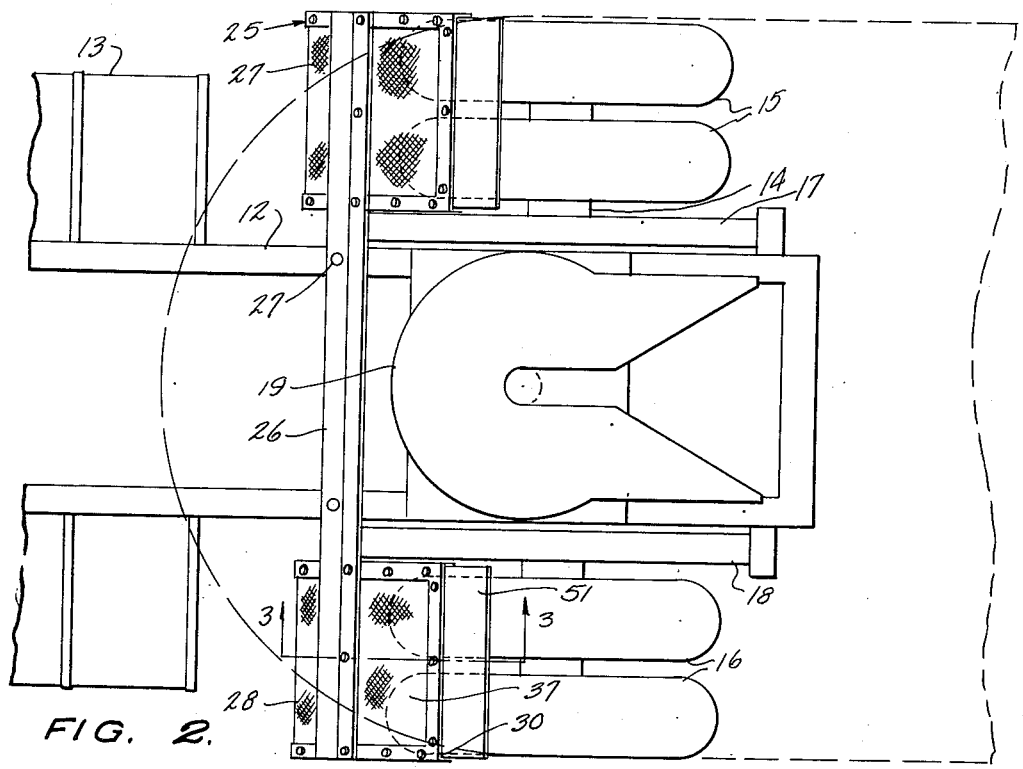
Figure 2 is a top plan view of the rear portion of the truck tractor with the wheel guards illustrated in Figure 1 mounted thereon.

With continued reference to the drawings, the truck fragmentarily illustrated includes a tractor component, generally indicated at 10 and a semi-trailer component generally indicated at 11. The tractor component has a frame 12 carrying saddle type gas tanks 13 and a cab, not illustrated ahead of the gas tanks. The frame is supported near its rear end on a rear axle 14 carried by dual rear traction wheels 15 and 16 disposed one at each side of the frame 12 near the rear end of the frame with their upper portions adjacent the top surface of the frame. The frame is supported on the rear axle by suitable springs 17 and 18 and carries a fifth wheel structure 19. The trailer unit 11 includes an elongated body 20 having a frame, not illustrated and provided with an undercut front end and a fifth wheel component 21 mounted on the bottom of the undercut front end portion thereof and engaged with the fifth wheel structure 19 on the tractor frame to couple the trailer to the tractor.

As the construction of semi-trailer trucks is well known to the art, a further illustration and description is considered unnecessary for the purposes of the present disclosure.

The wheel guard assembly is generally indicated at 25 and includes a supporting bar 26 extending transversely of the tractor frame 12 ahead of the fifth wheel structure 19 and projecting at its ends outwardly of the corresponding sides of the frame 12 substantially to the planes of the outer end surfaces of the dual traction wheels 15 and 16. This bar 26 is preferably an angle iron of suitable strength and dimensions rigidly secured to the frame by suitable means, such as the bolts or rivets 27 with one leg resting on the upper surfaces of the frame side members and the other leg inclined upwardly and somewhat rearwardly from the upper surfaces of the frame side members.

Wheel guards 28 and 29 are carried by the bar 26 one on each projecting end portion of the bar and in front of the corresponding traction wheels 15 and 16. As these guards may be substantially identical in construction and arrangement, a detailed description of one only is considered sufficient for the purposes of the present invention and the guard 29 has been selected for detailed illustration in Figures 3 and 4 and for detailed description.

Figure 1:
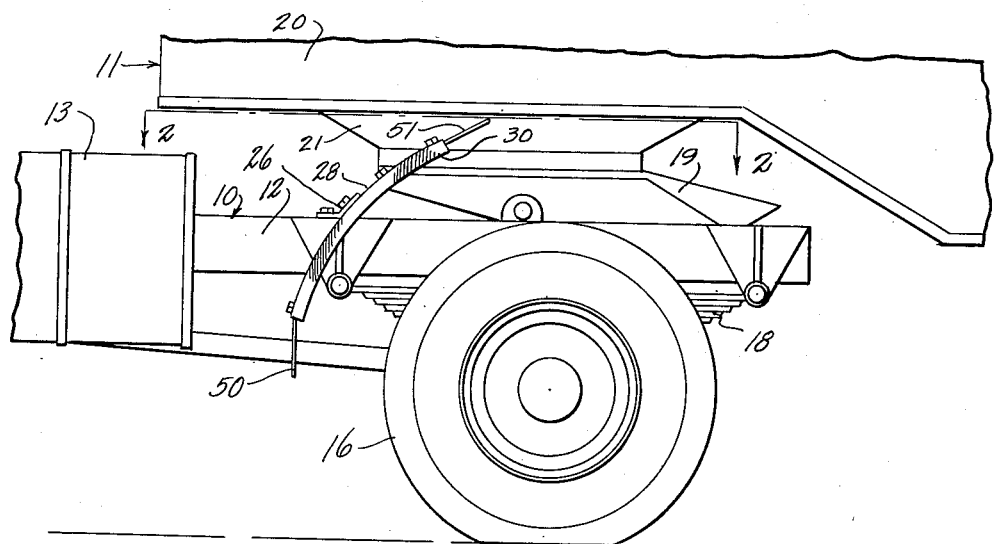
Figure 1 is a fragmentary side elevational view of a semi-trailer truck showing wheel guards illustrative of the invention mounted thereon.

The guard 29 comprises a rectangular frame 30 formed of angle iron and including spaced apart and substantially parallel side members 31 and 32 and a top cross member 33, the bottom of the frame being left open. The frame side members 31 and 32 are longitudinally curved on an arc having a radius somewhat greater than the radius of curvature of the tire treads of the wheels 15 and 16 and the members 31, 32 and 33 are so arranged that one leg of each member extends inwardly of the frame and one leg extends to the concave side of the frame and downwardly and rearwardly toward the corresponding wheel when the guard is mounted on the support bar 26, as illustrated in Figure 1. The members 31 and 32 are provided in their inwardly extending legs with spaced apart apertures, as indicated at 34 and 35, and the top cross member 33 is provided in its inwardly extending leg with spaced apart apertures, as indicated at 36.

A body 37 of flexible material, such as industrial rubber belting, of rectangular shape is disposed in the frame 30 and marginally against the concave sides of the inwardly projecting legs of the frame members 31 and 32 and corresponding side of the inwardly projecting leg of the frame member 33 and this body of flexible or resilient material is provided along its edges with spaced apart apertures 38 which register with corresponding apertures 34, 35 and 36.

A sub or under frame 40 of rectangular shape is also provided and this sub-frame is formed of flat strap iron and includes longitudinally curved side members 41 and 42 provided with spaced apart apertures 43 and 44 respectively and a top cross member 45 provided with spaced apart apertures 46. After the body 37 of flexible material is disposed in the frame 30 the sub-frame 40 is disposed against the side of the body 37 remote from the inwardly projecting legs of the members of the frame 30 and bolts or rivets, as indicated at 47, are inserted through the registering apertures in the frame 30, the material body 37 and the sub-frame 40 and clamp the frame, the material and the sub-frame together with the marginal portions of the material body compressed between the inwardly extending legs of the members of the frame 30 and the members of the frame 40. This assembly is then secured to the support bar 26 at the corresponding end of the support bar by bolts, as indicated at 48, which extend through registering apertures in the frame, the sub-frame and the material body adjacent the midlength location of the guard and through corresponding apertures in the upwardly and rearwardly projecting flange of the support bar 26.

The material body 37 is longer than the frames 30 and 40 and depends from the bottom ends of these frames to provide a downwardly extending flap 50 which protects the gasoline tanks 13 from material thrown by the corresponding traction wheels 15 and 16 but is flexible and easily movable so that it will not be broken off if it encounters an obstruction in the road.

A second body 51 of the same resilient material as that of which the body 37 is formed and of rectangular shape but of a length materially less than the length of the body 37 is secured along one edge to the top cross member 33 of the wheel guard frame by having a portion thereof overlapping the top surface of the inwardly projecting leg of the top member 33 and provided with apertures receiving the bolts 47' which extend through the top members of the frames 30 and 40 and through the upper end portion of the body 37. This second body 51 extends upwardly and rearwardly from the upper end of the guard 29 to a location adjacent the bottom surface of the front portion of the trailer 11 and is entirely unsupported except for its connection with the top cross member 53 of the guard frame. This upwardly extending, flexible flap permits movement of the semi-trailer relative to the tractor without damage to the wheel guards and at the same time closes the space between the upper ends of the rigid wheel guard frames and the bottom of the trailer so that material will not be thrown by the rear wheels through this space against the back of the tractor cab.

The two guards 28 and 29 overlie the upper front portions of the corresponding dual drive wheels 15 and 16 with their concave sides adjacent the wheels and interpose their bodies of flexible material between the wheels and the gasoline tank and cab of the tractor. The guards can be cleaned when necessary and the bodies of flexible material can be easily replaced when broken or damaged.

The invention may be embodied in other specific forms without departing from the essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a truck having a frame and traction wheels disposed one at each side of said frame at the rear end thereof with their top portions adjacent the top of the frame, a wheel guard assembly comprising a bar extending transversely of and secured to said frame with its end portions extending outwardly from the sides of said frame in front of the corresponding traction wheels, and longitudinally curved wheel guards secured intermediate their lengths to said bar one at each side of said truck frame and in front of the corresponding traction wheels with their concave sides adjacent said wheels, each of said guards comprising a rigid frame of rectangular shape open at its lower end, and a flat rectangularly shaped body of flexible material disposed in said guard frame and marginally secured thereto, said body of flexible material being longer than said guard frame and extending from the lower open end of the latter to provide a flexible depending flap.

2. In combination with a truck having a frame and traction wheels disposed one at each side of said frame at the rear end thereof with their top portions adjacent the top of the frame, a wheel guard assembly comprising a bar extending transversely of and secured to said frame with its end portions extending outwardly from the sides of said frame in front of the corresponding traction wheels, and longitudinally curved wheel guards secured intermediate their lengths to said bar one at each side of said truck frame and in front of the corresponding traction wheels with their concave sides adjacent said wheels, each of said guards comprising a rigid frame of rectangular shape open at its lower end, a flat rectangularly shaped body of flexible material disposed in said guard frame and marginally secured thereto with one end extending beyond the open lower end of said guard frame to provide a flexible depending flap, and a second flat rectangularly shaped body of flexible material secured along one edge to said guard frame at the upper end of the latter and extending upwardly and rearwardly from said guard frame.

3. In combination with a truck having a frame and traction wheels disposed one at each side of said frame at the rear end thereof with their top portions adjacent the top of the frame, a wheel guard assembly comprising a bar extending transversely of and secured to said frame with its end portions extending outwardly from the sides of said frame in front of the corresponding traction wheels, and longitudinally curved wheel guards secured intermediate their lengths to said bar one at each side of said truck frame and in front of the corresponding traction wheels with their concave sides adjacent said wheels, each of said guards comprising a main frame of rectangular shape, a flat rectangularly shaped body of flexible material disposed within said main frame and marginally overlapping the latter, a sub-frame of rectangular shape overlapping the marginal portion of said body at the side of the latter remote from said main frame, and spaced apart fasteners extending through said frames and said body compressing the marginal portion of said body between said frames.

References Cited in the file of this patent

UNITED STATES PATENTS

| Number | Name | Date |
|---|---|---|
| 1,579,623 | Atherton | Apr. 6, 1926 |
| 2,038,234 | Olen | Apr. 21, 1936 |
| 2,414,676 | Taurman et al. | Jan. 21, 1947 |
| 2,605,119 | Earnest | July 29, 1952 |

FOREIGN PATENTS

| Number | Country | Date |
|---|---|---|
| 255,597 | Great Britain | July 29, 1926 |